United States Patent [19]

Drlik

[11] 4,305,644

[45] Dec. 15, 1981

[54] MOLD-IN HINGE MEMBER

[75] Inventor: Günther Drlik, Pforzheim, Fed. Rep. of Germany

[73] Assignee: OBE-Werk Ohnmacht & Baumgärtner KG, Ispringen, Fed. Rep. of Germany

[21] Appl. No.: 51,759

[22] Filed: Jun. 25, 1979

[30] Foreign Application Priority Data

Jul. 13, 1978 [DE] Fed. Rep. of Germany ....... 2830754
Mar. 8, 1979 [DE] Fed. Rep. of Germany ....... 2909075

[51] Int. Cl.³ .................... G03B 21/18; G02C 5/14
[52] U.S. Cl. ..................................... 351/153; 351/121
[58] Field of Search ............. 351/153, 121; 16/128 A

[56] References Cited

FOREIGN PATENT DOCUMENTS 203755  4/1958  Austria ............................. 351/153
2003562 11/1969 France ............................. 351/153

Primary Examiner—John K. Corbin
Assistant Examiner—Rodney B. Bovernick
Attorney, Agent, or Firm—Balogh, Osann, Kramer, Dvorak, Genova & Traub

[57] ABSTRACT

The hinge members are intended for use in injection-molded spectacle rims of plastic material. An eyelet portion has a base section and a body section formed with a bearing aperture. An anchoring portion is adapted to be fixed in a mold used to make the rim by injection molding and to embed the anchoring portion in the rim. The anchoring portion has a first section, which adjoins the base section and is larger in axial thickness than the base section to form a first shoulder, and a second section, which adjoins the first section and is larger in axial thickness than the first section to form a second shoulder. At least part of the second section tapers toward the base section. The first shoulder is adapted to constitute a sealing surface when the anchoring portion is thus fixed in said mold.

13 Claims, 9 Drawing Figures

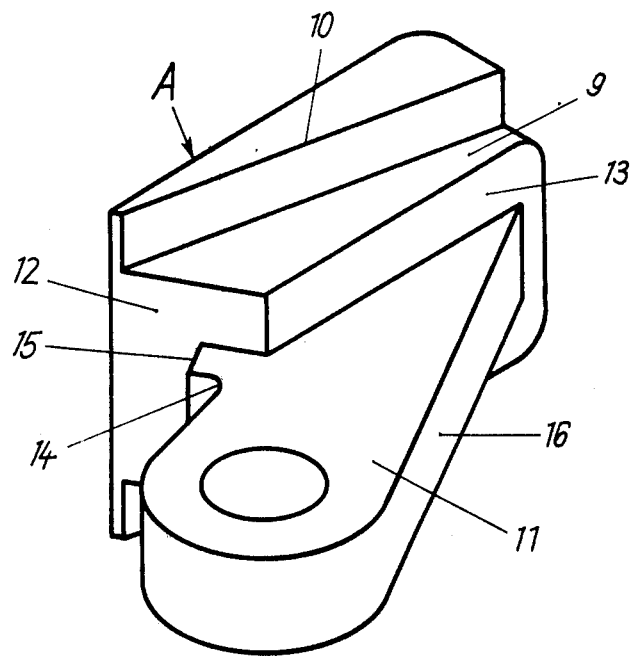

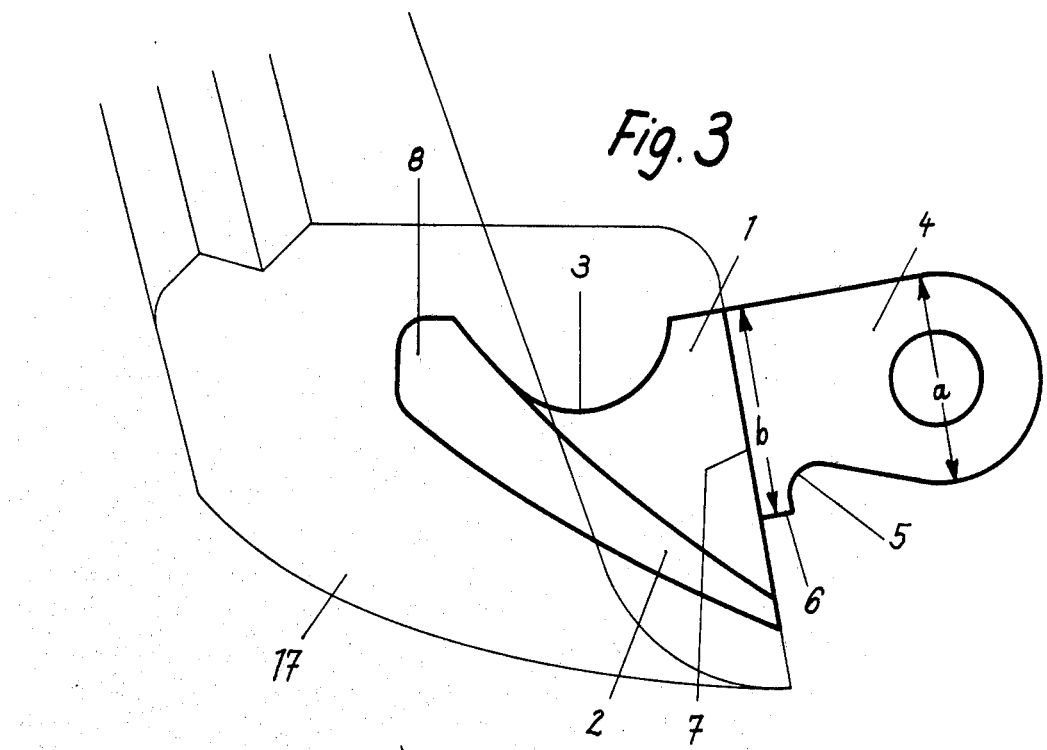
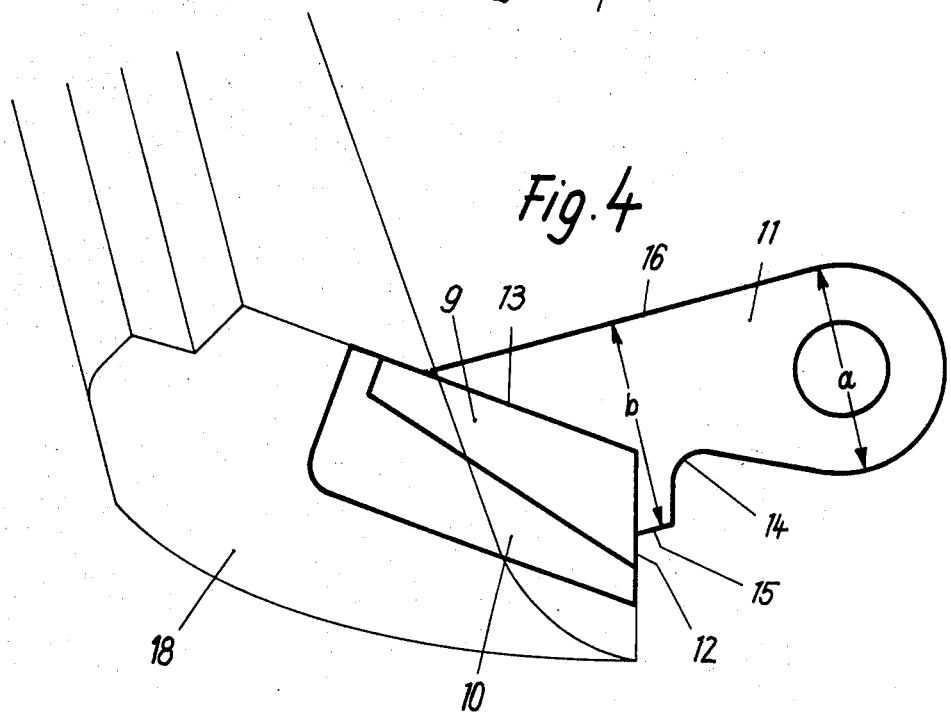

4,305,644

MOLD-IN HINGE MEMBER

DESCRIPTION OF THE INVENTION

This invention relates to a mold-in hinge member adapted to be mounted on a spectacle rim, comprising an eyelet portion and an anchoring portion adapted to be embedded in a spectacle rim consisting of thermosetting or thermoplastic material during the molding thereof.

U.S. Pat. application Ser. No. 802,886, now abandoned filed June 2, 1977, discloses such mold-in hinge member, in which the anchoring portion to be embedded in the plastic material has an edge rib that protrudes in the direction of the axis defined by the eyelet portion.

In the mold-in hinge member disclosed in said U.S. Patent applicaton, the eyelet portion comprises a base section formed with mutually opposite, parallel side face portions, a body section formed with a bearing aperture and with mutually opposite side face portions aligned with those of the base section, and a section of reduced width and cross-section between the base and body sections. The anchoring portion comprises a first section, which adjoins the base section, and is larger in axial thickness and width than the base section to form a first shoulder, which adjoins at least three sides of the base section and serves as a sealing surface during the molding operation. The anchoring portion also includes a second section, which compises a rib, which extends along an edge of the anchoring portion and is larger in axial thickness than the first section to form a second shoulder. In a preferred embodiment of the mold-in hinge member disclosed in the above-mentioned patent application, the first section has a side face and an end face forming a corner with the side face and adjoins said base section at said face, said end face, and said corner, and said side face and end face protrude from the base section in axial thickness on opposite sides to form shoulders adapted to constitute sealing surfaces when the anchoring portion is thus fixed in said mold. In the embodiment, the hinge-mounting portion of the rim may gradually merge into the adjacent bow in cross-section.

It has been the object of the invention disclosed in the above-mentioned patent application to provide such mold-in hinge member which can be held in the injection mold during the injection-molding operation in such a manner that the necessary seals are ensured and the hinge member is properly anchored in the molding. It is the object of the present invention to provide a molding member which has inexpensive means which strongly resist a pulling of the hinge member out of the spectacle rim in which it is embedded.

That object is accomplished in that at least part of the second section tapers toward said base section. The rib may be formed by a prosmatic retaining plate, which tapers toward the base section.

It is another object of the invention to provide a mold-in hinge member of the kind described in which the anchoring portion presents a satisfactory resistance to being pulled out of the spectacle rim and is so small that it can be embedded in a spectacle rim having a hinge-mounting portion which is pleasing in appearance because it is relatively small in volume. Besides, the mold-in hinge should be suitable for being automatically fed to the molds used for the injection molding of the rims.

In a mold-in hinge member of the kind described, this object is accomplished in that the anchoring portion is symmetrical and formed on both sides with curved recesses between the second shoulder and the base portion. This makes possible the use of a compact anchoring member, which occupies only a small volume of the hinge-mounting portion.

Embodiments of a mold-in hinge member according to the present invention will now be described by way of example with reference to the drawings, in which FIG. 1 is a perspective overall view showing a first embodiment and FIG. 2 is a perspective overall view showing a second embodiment.

FIGS. 3 and 4 are top plan views showing the mold-in hinge members of FIGS. 1 and 2, respectively, embedded in a spectacle rim.

Figure 1:
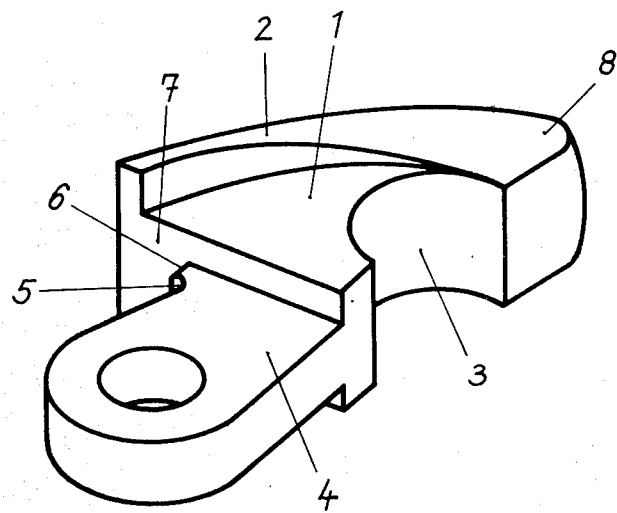

In the first embodiment, shown in FIGS. 1 and 3, the anchoring portion 1 tapers in the shape of a crescent and has a shoulder-forming rib 2, which extends along the concave side of the anchoring portion 1. When viewed as in FIG. 1, the rib 2 protrudes upwardly and downwardly from the remainder of the anchoring portion 1, which on the side opposite to the rib 2 defines an arcuate recess 3. The protruding shoulder-forming rib 2 is formed by a retaining plate and is arcuate and tapers in width toward the eyelet portion 4. This taper of the rib 2 improves the fixation of the anchoring portion in the mold during the injection molding of the spectacle rim and also improves the shape of the side faces of the spectacle rim. As is apparent particularly from the perspective view in FIG. 1, the hinge member is cascaded in cross-section from the eyelet portion 4 to the rib 2 of the anchoring portion 1.

In accordance with the teaching of the above-mentioned patent application, the eyelet portion 4 has a recess near the anchoring portion 1. Because the eyelet portion is smaller in cross-section at said recess 5, the optician can readily adjust the inclination of the eyelet portion.

Also in accordance with the teaching of the above-mentioned application, the eyelet portion 4 is formed with a base section 6, which has parallel side faces and adjoins the anchoring portion 1 in a width b which is equal to the width a of the body section of the eyelet portion so that a satisfactory seal is ensured at the base of the eyelet portion when the hinge member is held in the mold during the injection molding of the spectacle rim. The anchoring portion 1 adjoins the eyelet portion 4 at an end which forms a sealing shoulder 7, which adjoins the eyelet portion 4 on three sides thereof. At its end opposite to the eyelet portion 4, the anchoring member 1 has a portion 8 having a curved end face.

In the second embodiment shown in FIGS. 2 and 4 of the drawing, the anchoring portion of the mold-in hinge member comprises a retaining block 9 and a shoulder-forming rib 10, which adjoins said block and is formed by a retaining plate, which tapers toward the eyelet portion. Just as in the first embodiment, this design results in an improved or enhanced anchoring.

The eyelet portion 11 is adjoined by the block 9 at an end face 12 and that side face 13 of the block which is opposite to the rib 10. These end and side faces 12 and 13 of the retaining block 9 constitute sealing surfaces, which adjoin the base portion of the flat eyelet portion 11 on both sides thereof. The eyelet portion 11 is offset from the retaining block 9 and on the left side, when viewed as in FIG. 2, has a recess 14, at which the cross-section of the eyelet portion is reduced to facilitate the adjustment of its inclination. To ensure that the retaining block 9 will be held in position and sealed as the spectacle rim is molded around the retaining block, the eyelet portion has a base section, which has parallel side faces 15 and 16. Again, the maximal diametrical width a of the body section equals the width b of its base section.

It is apparent that in the second embodiment too the hinge member is cascaded from the eyelet portion to the rib 10 of the retaining block 9. This is particularly apparent from the perspective view of FIG. 2. The end and side faces 12 and 13 of the retaining block 9 serve as sealing surfaces during the molding operation and are succeeded by anchoring shoulders formed by a retaining plate 10, which tapers in width. The outside surface A of said retaining plate may be ornamental or designed to carry ornament, as will be desirable particularly with spectacle rims made of transparent plastic material.

Owing to their specific design, these hinge members can be embedded in injection-molded spectacle rims of thermosetting or thermoplastic material. As is apparent from FIGS. 3 and 4, the hinge-mounting portion 17 or 18 of the spectacle rims may taper to the spectacle bow to which it is connected by the hinge member. The arrangement shown in FIG. 4 permits the bow to be rotated through 180° whereas the arrangement shown in FIG. 3 permits the bow to be rotated through 90°.

In the embodiment shown in FIGS. 5 to 9, the anchoring portion of the hinge member consists of a symmetrical foot 21, which at its end opposite to the eyelet portion 24 is provided with a retaining plate 22, which protrudes from the foot on all sides. Between the retaining plate 23 and the eyelet portion 24, the foot 21 has arcuate recesses 23 on both sides. The symmetrical foot 21 has in a top plan view generally an I-shaped configuration and in side elevation has together with the eyelet portion 24 the configuration of a T. At its end adjoining the eyelet portion 24, the foot 21 forms a shoulder 27, which protrudes from the eyelet portion 24 on all sides. At its end opposite to the eyelet portion 24, the foot 21 is provided with a flange consisting of the retaining plate 22, which has opposite to the eyelet 24 a curved surface, which may be ornamental. As is particularly apparent from the perspective view of FIG. 5 and the side elevation of FIG. 8, the hinge member is again cascaded from the eyelet portion 24 to the retaining plate 22.

Again in accordance with the teaching of the above-mentioned application, the eyelet portion 24 joined to the foot 21 has a lateral recess 25 and at said recess is smaller in cross-section to facilitate the adjustment of the inclination of the eyelet portion by the optician. Also in accordance with the teaching of the above-mentioned application, the eyelet portion has a base section 26, which has parallel side faces to ensure that the width a of the body section and the maximal diametrical width b of the base section of the eyelet portion 24 are equal so that a seal is ensured during the injection molding of the spectacle rim about the hinge member. The sealing shoulder 27 of the foot 21 at the end thereof which adjoins the eyelet portion 24 extends around four sides of the eyelet portion 24.

Figure 5:
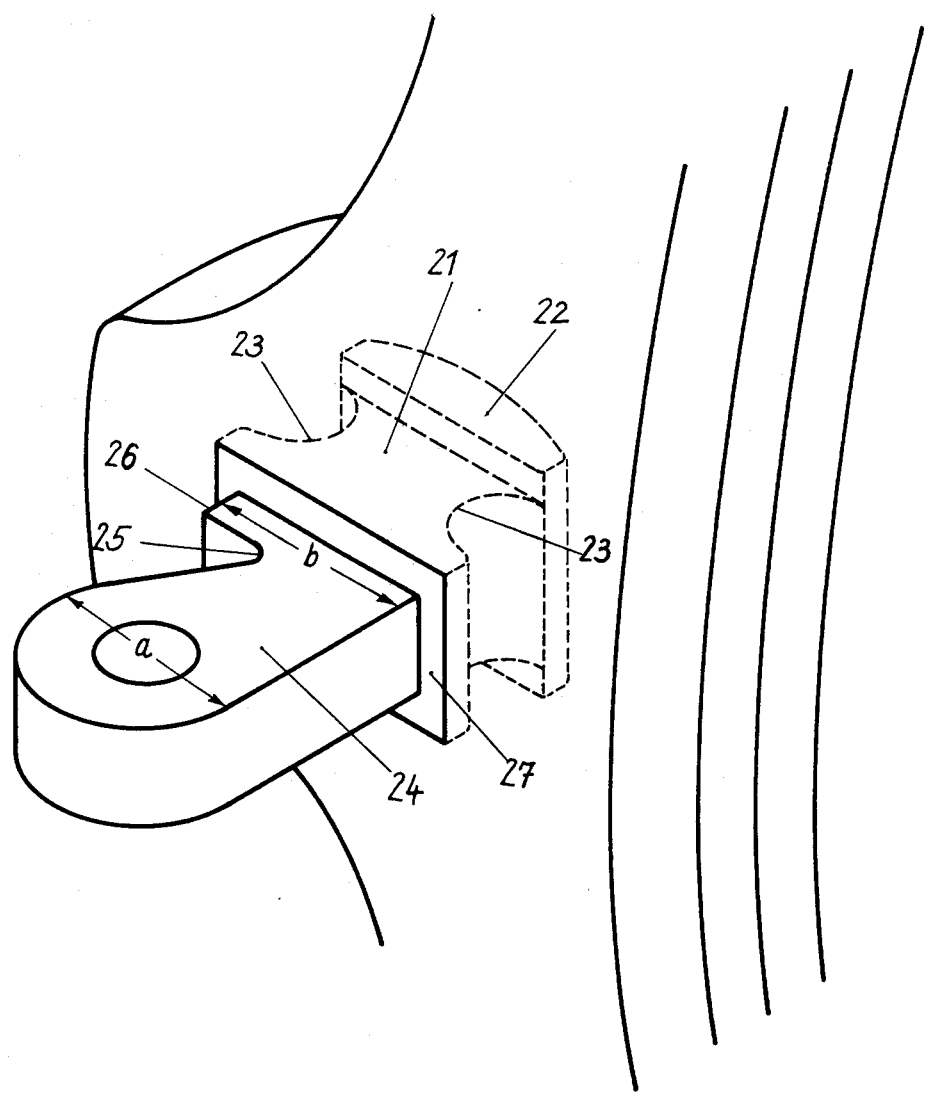
FIG. 5 is a perspective overall view showing a third embodiment embedded in an injection-molded rim and FIG. 6 an elevation showing the mold-in hinge member of FIG. 5 inserted in an injection mold.
Figure 6:
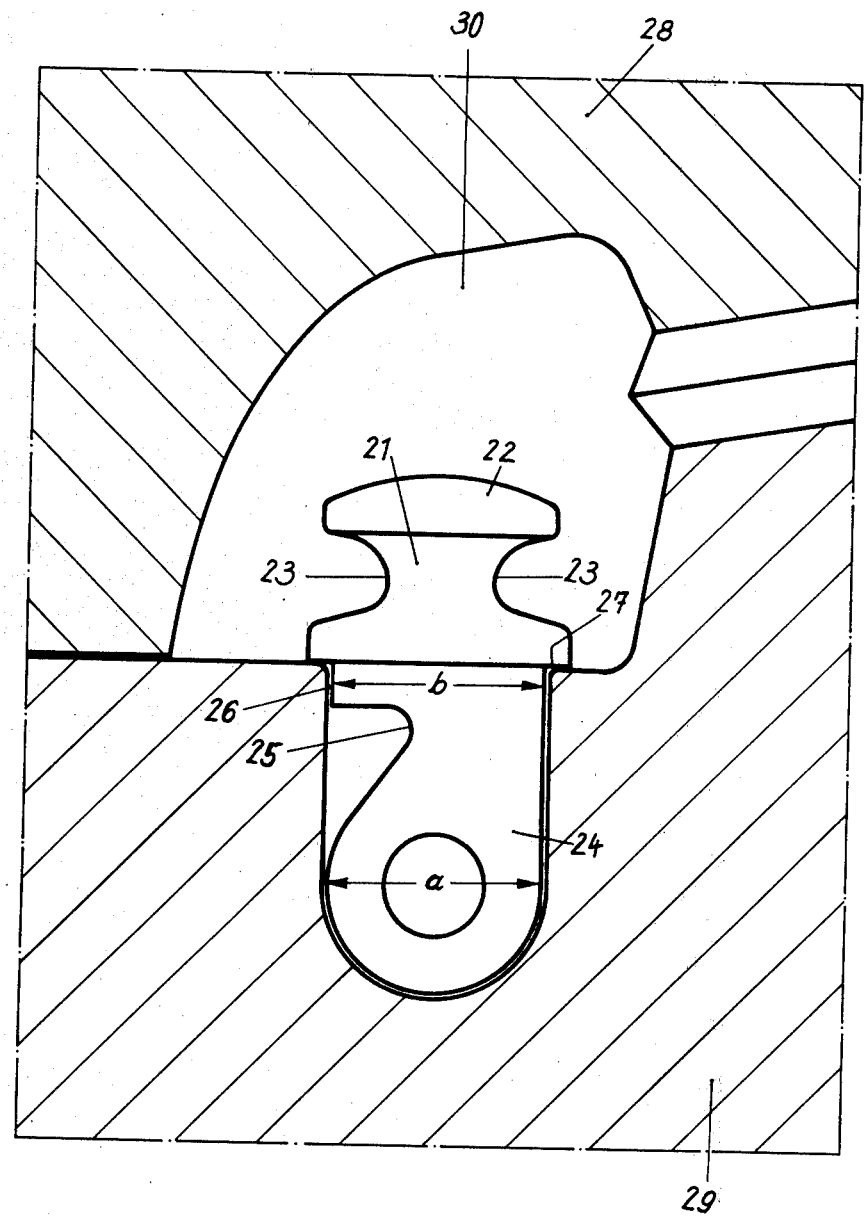
Figure 7:
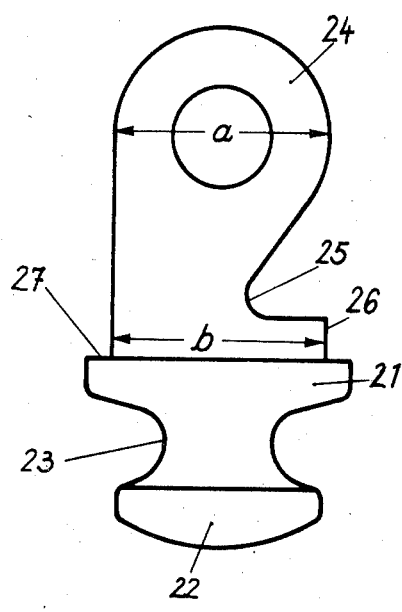
FIGS. 7 to 9 are, respectively, a top plan view, a side elevation and front elevation showing the hinge members of FIGS. 5 and 6.
Figure 8:
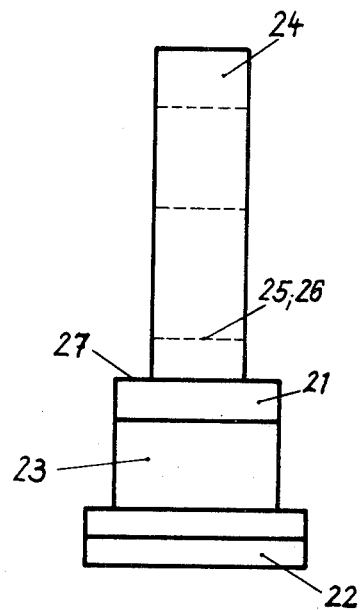
Figure 9:
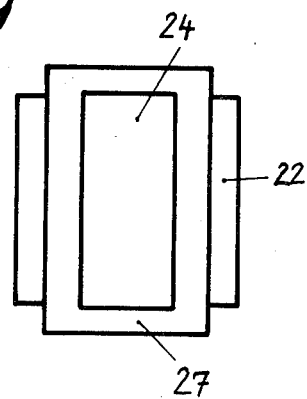

FIGS. 7 to 9 are respectively, front and side elevations and a top plan view showing the hinge member which is shown in perspective in FIG. 5. FIG. 6 shows the hinge member 21 to 27 embedded in the hinge-mounting portion 30 of the spectacle rim that is being injection molded in a two-part mold 28, 29. The function of the sealing shoulder 27 is also apparent from FIG. 6.

Owing to their compact, symmetrical shape, the hinge members shown in FIGS. 5 to 9 are particularly desirable for spectacles which are pleasing in appearance because they have thin rims with hinge-mounting members which have only a small volume.

What is claimed is:

1. A mold-in hinge member for injection-molded spectacle rims of plastic material, comprising
   an eyelet portion having a base section and a body section formed with a bearing aperture and
   an anchoring portion, which is adapted to be fixed in a mold used to make said rim by injection molding and to embed said anchoring portion in said rim,
   said anchoring portion having a first section, which adjoins said base section and is larger in thickness than said base section to form a first shoulder, and a second section, which adjoins said first section and is larger in thickness than said first section to form a second shoulder,
   said second section comprising an anchoring rib which extends along an edge of said anchoring portion, and is formed with said second shoulder, so as to ensure proper anchoring of the hinge member in the rims' plastic material,
   said first shoulder being adapted to constitute a sealing surface, cooperating with said base section to ensure a seal when said anchoring portion is thus fixed in said mold.

2. A mold-in hinge member as set forth in claim 1, in which
   said base section is formed with mutually opposite, parallel side face portions,
   said body section is formed with mutually opposite side face portions adjoining those of said base section, and
   said eyelet portion comprises a section of reduced width and cross-section interconnecting said base and body sections.

3. A mold-in hinge member as set forth in claim 2, in which said parallel side face portions of said base section are spaced apart by a distance which is equal to the maximal diametrical width of said body section.

4. A mold-in hinge member as set forth in claim 1, in which said first section is larger in axial thickness and in width than said base section so that said first shoulder adjoins said base section on at least three sides.

5. A mold-in hinge member as set forth in claim 1, in which at least part of said section section tapers in width toward said base section.

6. A mold-in hinge member as set forth in claim 1, in which
   said second section extends on one side of said first section,
   said first section has a side face on the side opposite to said second section and an end face forming a corner with said side face and adjoins said base section at said side face, said end face and said corner.

7. A mold-in hinge member as set forth in claim 1, in which said rib extends generally toward said base section and tapers in width toward said base section.

8. A mold-in hinge member as set forth in claim 7, in which said rib is formed by a prismatic retaining plate, which tapers toward said base section.

9. A mold-in hinge member as set forth in claim 8, in which said rib is formed by an arcuate retaining plate, which tapers in width toward said base section.

10. A mold-in hinge member as set forth in claim 1, in which
said anchoring portion is symmetric,
said rib is disposed at that end of said anchoring portion which is opposite to said base section, and
said second section tapers in width from said rib toward said first section.

11. A mold-in hinge member as set forth in claim 10, in which said anchoring member is provided with arcuate recesses on opposite sides.

12. A mold-in hinge member as set forth in claim 11, in which said anchoring portion is generally I-shaped in a top plan view, and said anchoring portion together with said eyelet portion are T-shaped in a side elevation view.

13. A mold-in hinge member as set forth in claim 11, in which said rib is formed by a retaining plate, which has a curved surface at said end of said anchoring portion.

* * * * *